United States Patent
Jan et al.

(10) Patent No.: US 10,063,661 B2
(45) Date of Patent: Aug. 28, 2018

(54) MULTI-TENANT CLOUD-BASED QUEUING SYSTEMS

(71) Applicant: Oracle International Corporation, Redwood Shores, CA (US)

(72) Inventors: Wai Jan, Portland, OR (US); Gregory Cook, Market Harborough (GB); Bruce Irvin, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 482 days.

(21) Appl. No.: 14/597,074

(22) Filed: Jan. 14, 2015

(65) Prior Publication Data

US 2016/0205180 A1    Jul. 14, 2016

(51) Int. Cl.
G06F 15/16 (2006.01)
H04L 29/06 (2006.01)
G06F 9/54 (2006.01)

(52) U.S. Cl.
CPC .............. *H04L 67/42* (2013.01); *G06F 9/546* (2013.01); *G06F 2209/548* (2013.01)

(58) Field of Classification Search
CPC .................... H04L 67/1095; H04L 67/4097
See application file for complete search history.

(56) References Cited

U.S. PATENT DOCUMENTS 6,751,671 B1    6/2004    Urien
6,970,935 B1    11/2005   Maes
(Continued)

FOREIGN PATENT DOCUMENTS

CA    1271827 A1    7/1990
EP    1569112       8/2005
(Continued)

OTHER PUBLICATIONS

Chanliau, Oracle Enterprise Gateway:Securing SOA and Web Services with Oracle Enterprise Gateway, retrieved from the Internet: URL:http://www.oracle.comjtechnetwork/middleware/id-mgmtjoeg-tech-wp-apr-2011-345875.pdf, Apr. 30, 2011, 22 pages.

(Continued)

*Primary Examiner* — Sargon Nano
*Assistant Examiner* — Kidest Mendaye
(74) *Attorney, Agent, or Firm* — Kilpatrick Townsend & Stockton LLP

(57) ABSTRACT

Techniques are disclosed for multi-tenant cloud-based queuing. Certain techniques are disclosed herein that provide for interactions and observability between tenant queues within a multi-tenant cloud-based queuing database. In some embodiments, the queues may be utilized by both users and merchants for both online and point-of-service interactions. Multiple queues for multiple tenants are hosted by a cloud computing system. Each queue may include one more queue entries, each of which includes a ticket value, and may further include a ticket alias. The ticket values and/or ticket aliases may be decoupled from a queue position for the entry. In some embodiments, the queue entries may be swapped within a queue or between queues, and the system may enable searching in or automated actions between queues and/or tenants based in part upon queue conditions.

18 Claims, 8 Drawing Sheets

(56) References Cited

U.S. PATENT DOCUMENTS

| | | | |
|---|---|---|---|
| 7,430,290 B2 | 9/2008 | Zhu | |
| 8,504,837 B2 | 8/2013 | Jasper et al. | |
| 9,043,600 B2 | 5/2015 | Jasper et al. | |
| 2003/0187631 A1 | 10/2003 | Masushige et al. | |
| 2004/0107196 A1 | 6/2004 | Chen et al. | |
| 2004/0162823 A1 | 8/2004 | van de Loo et al. | |
| 2005/0089053 A1* | 4/2005 | Zhu | H04M 3/5191 370/412 |
| 2006/0112127 A1 | 5/2006 | Krause et al. | |
| 2006/0206348 A1 | 9/2006 | Chen et al. | |
| 2008/0010676 A1 | 1/2008 | Dosa Racz et al. | |
| 2009/0158302 A1 | 6/2009 | Nicodemus et al. | |
| 2009/0170557 A1 | 7/2009 | Chauhan et al. | |
| 2009/0249350 A1* | 10/2009 | Senders | G06Q 10/06 718/104 |
| 2010/0299508 A1* | 11/2010 | Luttrell | G06F 9/3824 712/234 |
| 2011/0307547 A1* | 12/2011 | Backer | G06Q 10/02 709/203 |
| 2012/0109902 A1 | 5/2012 | Rozensztejn et al. | |
| 2012/0155470 A1 | 6/2012 | McNamee et al. | |
| 2012/0158872 A1 | 6/2012 | McNamee et al. | |
| 2012/0158993 A1 | 6/2012 | McNamee et al. | |
| 2012/0158994 A1 | 6/2012 | McNamee et al. | |
| 2012/0158995 A1 | 6/2012 | McNamee et al. | |
| 2012/0176968 A1 | 7/2012 | Luna | |
| 2013/0055256 A1 | 2/2013 | Banga et al. | |
| 2013/0086210 A1 | 4/2013 | Yiu et al. | |
| 2013/0086211 A1 | 4/2013 | Sondhi et al. | |
| 2013/0103486 A1* | 4/2013 | Hess | G06Q 30/02 705/14.38 |
| 2013/0110778 A1 | 5/2013 | Taylor et al. | |
| 2013/0174154 A1 | 7/2013 | Poore et al. | |
| 2013/0219176 A1 | 8/2013 | Akella et al. | |
| 2013/0275492 A1 | 10/2013 | Kaufman et al. | |
| 2013/0332509 A1* | 12/2013 | Schwartz | G07C 11/00 709/203 |
| 2014/0025832 A1 | 1/2014 | Ito | |
| 2014/0089075 A1* | 3/2014 | Sanchis | G06Q 30/0226 705/14.27 |
| 2014/0181864 A1 | 6/2014 | Marshall et al. | |
| 2015/0082385 A1 | 3/2015 | Maria | |
| 2015/0130365 A1 | 5/2015 | Kim et al. | |
| 2015/0227405 A1 | 8/2015 | Jan et al. | |
| 2015/0227406 A1 | 8/2015 | Jan et al. | |
| 2015/0229638 A1 | 8/2015 | Loo | |
| 2015/0229645 A1 | 8/2015 | Keith et al. | |
| 2015/0278245 A1 | 10/2015 | Sagar et al. | |
| 2016/0034876 A1* | 2/2016 | Speiser | G06Q 30/06 705/21 |

FOREIGN PATENT DOCUMENTS

| | | |
|---|---|---|
| EP | 2849061 | 3/2015 |
| WO | 2013071087 | 5/2013 |
| WO | 2013086211 | 6/2013 |
| WO | 2013126570 | 8/2013 |
| WO | 2015038225 | 3/2015 |
| WO | 2015042547 | 3/2015 |
| WO | 2015050568 | 4/2015 |
| WO | 2015119529 | 8/2015 |
| WO | 2015119658 | 8/2015 |
| WO | 2015119659 | 8/2015 |

OTHER PUBLICATIONS

Facemire et al., Cloud Mobile Development: Enabled by Back-End-As-A-Service, Mobile's New Middleware, Aug. 30, 2012, 15 pages.
Ponge, Fork and Join: Java can excel at painless parallel programming too!. Oracle Technology Network, (retrieved on Sep. 15, 2014], retrieved from the internet: <URL: http://www.oracle.com/technetwork/articles/java/fork-join-422606.html>, Jul. 2011, 7 pages.
Ponge, Scenarios for using Oracle Nashorn as a command-line tool and as an embedded interpreter in Java applications, Oracle Technology Network [online], (retrieved on Sep. 15, 2014], retrieved from the internet: <URL: http://www.oracle.com/technetwork/articles/java/jf14-nashorn-2126515.html>, 8 pages.
Woods, Oracle Unveils Project Avatar at JavaOne, InfoQ.com, Sep. 27, 2013, [online], [retrieved on Sep. 15, 2014], retrieved from the internet :< URL: http://www.infoq.com/news/2013/09/oracle-unveils-avatar>, Sep. 27, 2013, 9 pages.
International Application No. PCT/RU2014/000677, International Search Report and Written Opinion dated Feb. 19, 2015, 13 pages.
International Application No. PCT/US2014/044165, International Search Report and Written Opinion dated Nov. 11, 2014, 9 pages.
International Application No. PCT/US2014/053747, International Search Report and Written Opinion dated Nov. 25, 2014, 17 pages.
International Application No. PCT/US2014/056154, International Search Report and Written Opinion dated Dec. 5, 2014, 12 pages.
U.S. Appl. No. 14/475,285, Notice of Allowance dated Aug. 24, 2015, 17 pages.
VirtuaQ: Virtual Queue Management System. esco.com.sg [online]. Copyright 2012, Esco Pte. Ltd., [site visited on May 26, 2014]. Retrieved from the Internet: <URL: http://www.esco.com. sg/development-and-mobility/virtuaq/>, 3 pages.
Electronic Ticket System—Queue Management without Lines. queuesolutions.com [online]. Copyright 2013 Queue Solutions, Inc. [site visited on May 26, 2014]. Retrieved from the Internet: <URL: http://queuesolutions.com/electronic-ticket-system.php>, 2 pages.
Lawson, Alex. "House of Fraser trials virtual queue system for online collection." Retail Week [online]. EMAP Publishing Limited, Sep. 6, 2013 [retrieved May 26, 2014]. Retrieved from the Internet: <URL: http://www.retail-week.com/companies/house-of-fraser/house-of-fraser-trials-virtual-queue-system-for-online-collection/5052769.article>, 3 pages.
eQ™ Virtual Queuing. tensator.com [online]. Copyright Tensator [site visited on May 26, 2014]. Retrieved from the Internet: <URL: http://www.tensator.com/us/showroom/eq-virtual-queuing.aspx>, 1 page.
Queuing at busy check—in counters is now a thing of the past, thanks to our online "self check—in" system. airnamibia.com [online]. Air Namibia [site visited on May 23, 2014]. Retrieved from the Internet: <URL: http://www.airnamibia.com/plan-book/check-in-online/>, 2 pages.
Web Check-in—Bangkok Airways. bangkokair.com [online]. Bangkok Airways [site visited on May 23, 2014]. Retrieved from the Internet: <URL: http://www.bangkokair.com/pages/view/web-check-in>, 2 pages.
Disney FastPass+. AllEars.Net [online]. R.Y.I. Copyright Enterprises, LLC, 1999-2014 [site visited on May 26, 2014]. Retrieved from the Internet: <URL: http://allears.net/tp/ fastpass-plus.htm>, 4 pages.
Booking and Paying for Your Holiday—Holidays FAQs. Jet2holidays.com [online]. Copyright Jet2holidays.com, 2002-2014, a subsidiary of Dart Group PLC [site visited on May 22, 2014]. Retrieved from the Internet: <URL: http://www.jet2holidays.com/faqs-essential-info2.aspx>, 2 pages.
Dispersed Virtual Queue Management. tensabarrieronline.com [online]. Copyright 2014 Tensabarrieronline—Tamis Corporation [site visited on May 26, 2014]. Retrieved from the Internet: <URL: http://www.tensabarrieronline.com/shop/dispersed-virtual-queue-management/>, 2 pages.
Electronic Queuing—QtracVR Virtual Queuing System. lavi.com [online]. Copyright 2014 Lavi Industries [site visited on May 26, 2014]. Retrieved from the Internet: <URL: http://www.lavi.com/electronic-queuing/virtual-queuing.aspx>, 2 pages.
NEMO-Q Virtual Queuing. NEMO-Q.com [online]. Copyright 2014 NEMO-Q [site visited on May 23, 2014]. Retrieved from the Internet: <URL: http://www.nemo-q.com/virtual_queuing_systems.html>, 3 pages.
Keating, Michael. "Cloud-based setup reduces wait-times at government offices (with related video)." American City & County [online]. Penton, May 5, 2014 [retrieved May 22, 2014]. Retrieved from the Internet: <URL: http://americancityandcounty.com/tele-

(56) References Cited

OTHER PUBLICATIONS communications/cloud-based-setup-reduces-wait-times-government-offices-related-video>, 4 pages.

\* cited by examiner

MULTI-TENANT CLOUD-BASED QUEUING SYSTEMS

FIELD

Embodiments of the invention relate to the field of computing systems; and more specifically, to methods, apparatuses, and systems for multi-tenant cloud-based queuing.

BACKGROUND

Functionality and data for software applications can be provided over a network (e.g., the Internet) by a system of one or more computers. Software as a Service (SaaS), for example, is one way of providing software applications by centrally hosting applications on computing devices that are typically remotely located from the where the applications may be utilized and/or interacted with. Such "on-demand" software is often accessed by users using a web browser or another thin client.

Many types of software applications, especially those provided in "the cloud," are configured to serve multiple client organizations. For example, a business application can serve different customers, which can be different people, businesses, merchants, etc. One way to design and structure applications and resources to accommodate multiple users is through the principle of multi-tenancy. In contrast to multi-instance architectures that utilize separate instances of an application operate at one location on behalf of multiple tenants, multi-tenancy is software architecture principle in which one single instance of an application or software executes at a location that can serve multiple tenants. Thus, for a conventional application using multi-tenancy, a single instance of the application runs on a server, instead of having separate application instances or hardware systems for different tenants. An example of a multi-tenant system is a computing system that is accessible to multiple independent parties to provide those parties with application execution and/or data storage.

A tenant is a group of users sharing a common view of a software application or collection of data. Thus, through a multi-tenant architecture, a software application is designed to provide every tenant a dedicated or customized version of the software instance. This dedicated view can include per-tenant data, configuration settings, specialized functionality, and/or other non-functional properties.

With a multi-tenant system, tenants do not need to install software, maintain backups, move data to laptops to provide portability, etc. Instead, each tenant simply needs to access the multi-tenant system to operate the applications and/or access that tenant's data. For example, a user need only have access to a user client device with network connectivity, such as a desktop computer with Internet access and a browser or other HTTP client, for example.

One type of multi-tenant cloud software is a multi-tenant database system. Multi-tenant database systems allow for users to access tenant-specific data from a network source that, to the user, appears to be dedicated and/or centralized, but might be distributed for backup, redundancy and/or performance reasons. Although there is an appearance for each tenant of a dedicated resource, many such tenants can access the same system to perform application functions such as manipulating that tenant's data.

In database systems, interactions such as accessing, retrieving and processing occur through queries made in accordance with the application program interface (API) protocol for the database. For example, a tenant may generate a query to interact with a relational database using Structured Query Language (SQL) statements. SQL statements are used both for interactive queries for data from the database (e.g., inserting data, updating data, selecting data, deleting data, etc.) and for gathering statistics and other data.

BRIEF SUMMARY

The present disclosure relates generally to computing systems; and more specifically, to multi-tenant cloud-based queuing systems. Certain techniques are disclosed herein that provide for interactions and observability between tenant queues within a multi-tenant cloud-based queuing database. In some embodiments, the queues may be utilized by both users and merchants for both online and point-of-service interactions.

According to some embodiments, multiple queues for multiple tenants are hosted by a cloud computing system. In some embodiments, each queue includes one more queue entries, and each queue entry includes a ticket value, and may further include a ticket alias. The ticket values (and ticket aliases) in some embodiment are decoupled from a queue position for the entry, to allow for ticket values (and/or ticket aliases) to be moved from one queue entry to another in the queue or even into another queue.

In some embodiments, a multi-tenant cloud-based queuing system may receive a request to swap a queue position of a user with a queue position of another user, and cause the positions to be swapped.

In some embodiments, client devices may send queue utilization query messages to the queuing system seeking information or statistics describing the queues and their current state. For example, a queue utilization query message may seek an overall number of queue entries waiting in a queue or in multiple queues, an estimated wait time for a theoretical new queue entry to be serviced at one or more queues, a historic wait time for queue entries within one or more queues, etc.

In some embodiments, client devices may send queue search query messages to the queuing system seeking an identification of one or more tenants having queues satisfying one or more provided criterion of the queue search query message. For example, a queue search query message may include one or more criterion seeking an identifying of tenants (e.g., merchants) that provide service in a particular category of service, within a particular geographic location (or range of locations), and/or have a stipulated queue condition (e.g., have fewer then a particular number of waiting queue entries, have an expected wait time that is less than a particular threshold wait time, have queue entries that are available for trade, etc.).

In some embodiments, a multi-tenant cloud-based queuing system may receive a request from a client device to add a queue entry for a user into a first queue, and in response, may automatically add a queue entry for the user into a second queue. In some embodiments, the system may be configured to perform such alternate-queue insertions based upon a current queue condition of the requested first queue not satisfying a first condition (e.g., the queue is full, the queue includes a number of queue entries exceeding a threshold, etc.). In some embodiments, the first queue may be for a first tenant and the second queue may be for the first tenant or for a different tenant.

In some embodiments, queue users may be assigned one or more keys (or user token values) that are maintained by the multi-tenant cloud-based queuing system. The user, via a client device, may utilize one (or more) of these keys for authentication at a merchant, for example, by signing data using the key. In some embodiments, this encrypted data is passed on to the multi-tenant cloud-based queuing system, which can decrypt the data to thus confirm the identity of the user. In some embodiments, the queuing system may respond to the merchant with an authentication response message indicating a result of the authentication. In some embodiments, the client device may use a private key to encrypt a ticket alias or ticket value, and in some embodiments the client device may use the ticket value itself as a key or as authentication data. Thus, in some embodiments a user may be authenticated at a merchant without needing to provide any personally-identifying information to the merchant (e.g., at a point-of-service device).

Accordingly, embodiments of the invention provide several features. For example, in some embodiments, the multi-tenant cloud-based queuing system may enable interactions between the queues of different tenants. In some embodiments, users are able to easily identify queue conditions at multiple tenants, and in some embodiments can search for tenants matching a request criterion. Further, in some embodiments, a queuing system can provide users with a "backup" queue reservation in the event of a requested queue being full or having a queue state satisfying a particular configurable criterion. In some embodiments, users can be authenticated by the queuing system, without being required to divulge any sensitive information at a point-of-sale, for example.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The present disclosure relates generally to computing systems; and more specifically, to multi-tenant cloud-based queuing systems. Certain techniques are disclosed herein that provide for interactions and observability between tenant queues within a multi-tenant cloud-based queuing database. In some embodiments, the queues may be utilized by both users and merchants for both online and point-of-service interactions.

According to some embodiments, multiple queues for multiple tenants are hosted by a cloud computing system. In some embodiments, queues for each tenant are provided in a separate tenant database of a multi-tenant database. In some embodiments, each queue includes one more queue entries, and each queue entry includes a ticket value, and may further include a ticket alias. The ticket values (and ticket aliases) in some embodiment are decoupled from a queue position for the entry, to allow for ticket values (and/or ticket aliases) to be moved from one queue entry to another in the queue or even into another queue. Moreover, in some embodiments, the ticket values may only be known to the queuing system and the client device, and thus may be used as part of an authentication scheme.

In some embodiments, a multi-tenant cloud-based queuing system may enable multi-queue interactions, which may be between queues of different tenants or of a same tenant. For example, users may elicit queue entry swaps between queues of different tenants (e.g., merchants), search for tenants based upon queue characteristics at a point in time (or range of times), and/or benefit from automatic backup reservations at non-requested queues when attempting to gain a place within a desired queue.

Figure 1:
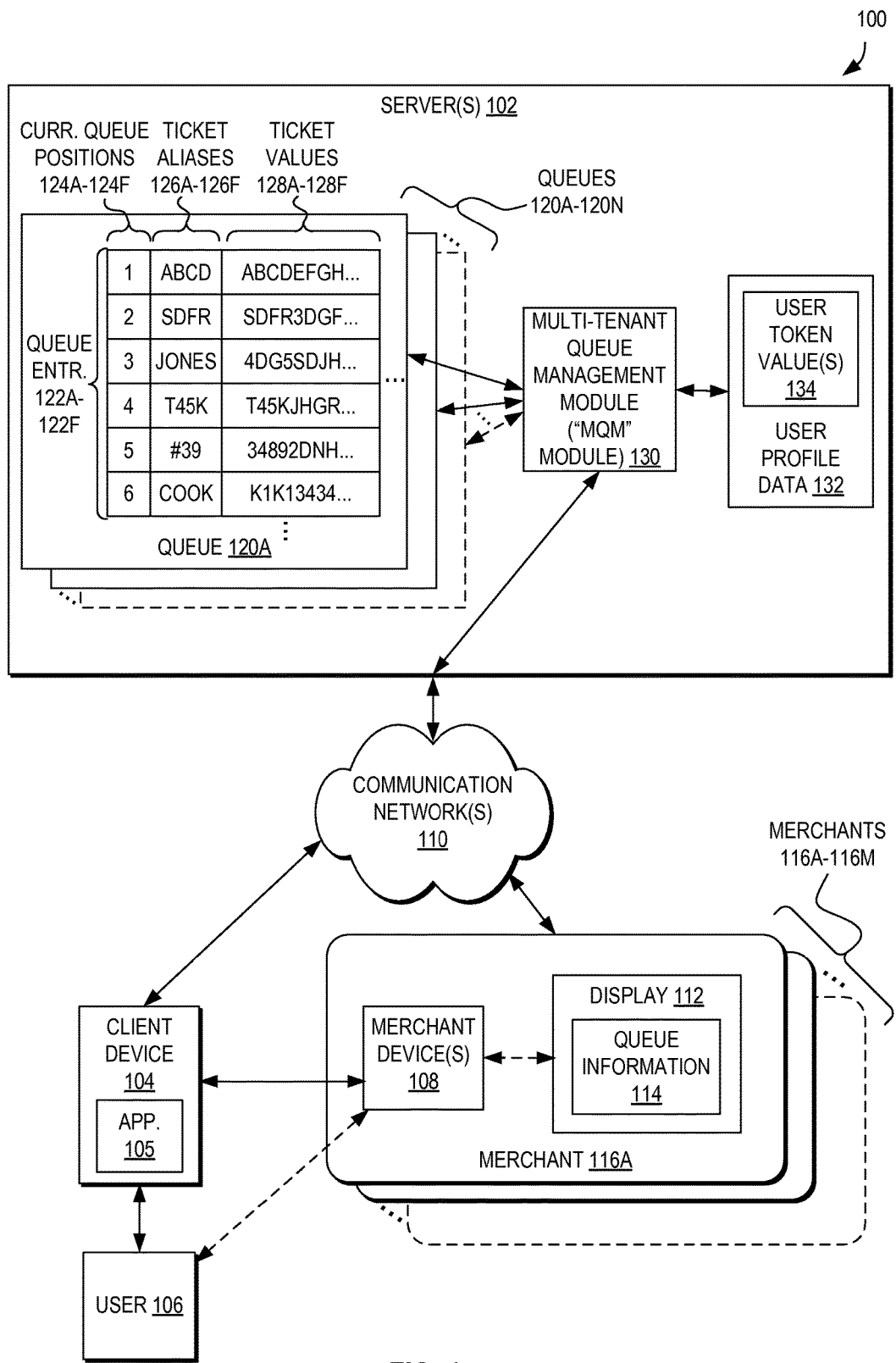
FIG. 1 illustrates a functional overview of a multi-tenant cloud-based queuing system including a multi-tenant queue management module according to some embodiments of the present invention.

FIG. 1 illustrates a functional overview of a multi-tenant cloud-based queuing system 100 including a multi-tenant queue management module 130 (or "MQM module") according to some embodiments of the present invention. FIG. 1 depicts an end user 106, a client device 104 of the end user 106, one or more communication networks 110, one or more merchants 116A-116M, as well as one or more servers 102 providing a multi-queue management module (or "MQM module") 130, one or more queues 120A-120N, and user profile data 132.

Throughout this disclosure, reference numerals ending with a letter (e.g., 120N, 116M, etc.) may be utilized to indicate that there could be more than one of a referenced element. However, the particular ending letter is not to be construed to indicate a particular number of an element, unless made clear based upon the particular context of use. For example, the use of "120N" for queues 120A-120N does not imply that there are fourteen queues simply because "N" is the fourteenth letter in the alphabet. Similarly, the use of "N" for some elements and "M" for other elements does not imply that there are different numbers of these elements, but only that it is possible in some embodiments that there could be different numbers of these elements.

In the depicted embodiment, each of merchants 116A-116M are associated with one or more corresponding queues 120A-120N. Although this depiction and description utilizes merchants as an example, this is merely illustrative as other entities such as people, organizations, places, events, games, etc., may similarly be associated with a queue.

In some embodiments, the queues are utilized for purposes of providing customer service. For example, a merchant 116A may utilize a queue 120A to provide orderly service by creating a line or ordering of customers (e.g., user 106) to establish the order in which a customer may be provided service.

As a first example, a merchant may be a restaurant and utilize a queue to indicate the order in which customers will be provided a table, or food at a pick-up window. As another example, a merchant may be a governmental office and utilize a queue to indicate the order in which citizens are able to speak with a clerk or representative regarding some matter. As another example, a merchant may be a medical office and utilize a queue to indicate the order in which patients may be seen by a doctor or medical staff. Of course, countless other scenarios exist for the use of queues by entities, and thus these provided examples are merely illustrative.

In this example, each queue 120A may include a defined number of queue entries 122 (e.g., 50 total queue "slots") or the queue may dynamically grow to accommodate any number of queue entries 122.

In the depicted embodiment, each of the queue entries 122 includes a current queue position 124, a ticket alias 126, and a ticket value 128, although in other embodiments not all of these values exist. Further details of these queue values and their use will be presented later herein after a description of other entities involved in the queuing system 100.

In FIG. 1, the first depicted merchant 116A is illustrated as including merchant device(s) 108 and a display 112. The merchant devices 108 may comprise a point-of-sale (POS) device (e.g., checkout or retail device) and may further include a server device at a same or different location working in concert with the POS device and perhaps other POS devices.

The merchant devices 108, in various embodiments, may utilize communication networks 110 to interact with the MQM module 130 for implementing the one or more queues for that merchant. For example, a merchant employee may interact with the merchant device(s) 108 to indicate that a particular user has been served, and as a result the merchant device(s) 108 may interact with the MQM module 130 to update the corresponding queue 120A. As a result, a queue entry for the serviced user may be removed or modified to indicate this service, and the MQM module 130 may transmit back updated queue information to the merchant device(s) 108.

Similarly, merchant device(s) 108 may transmit messages across communication networks 110 to the MQM module 130 to add one or more entries into the queue. For example, in an embodiment the merchant devices 108 include printing hardware or a ticket dispenser (e.g., dispensing paper ticket numbers), and when a physical queue ticket is provided to a user 106, the merchant devices 108 may report such dispensing information to the MQM module 130 for queue updating. Alternatively, the merchant devices 108 may transmit one or more messages to the MQM module 130 at one time to request one or more queue entries 122 to be added to the queue 120A in advance of physical queue tickets being dispensed.

Additionally, users (e.g., user 106) may utilize an application 105 of a client device 104 to interact with the MQM module 130 for queue-related purposes. For example, a user 106 may use a web browser application 105 on a mobile client device 104 to visit a website associated with the merchant 116A (or MQM module 130) to attempt to reserve a spot (i.e., create a queue entry 122A) in a queue 120A associated with a merchant 116A. In some embodiments, this interaction may occur between the user's 106 client device 104 and a merchant device 108 (e.g., using near field communication (NFC) techniques, etc.), and the merchant device 108 will then interact with the MQM module 130 via the communication network(s) 110 to reserve a queue spot for the user 106.

In some embodiments, either by the merchant devices 108 or directly by a display device 112, the display device 112 is updated with queue information 114. For example, queue information 114 may include an identifier (e.g., a ticket alias 126) of a queue entry 122 that is being served or next to be served, for example. In some embodiments, the queue information 114 may include multiple ticket aliases 126A-126F and/or current queue positions 124. For example, the display 112 may be updated to identify ticket aliases 126A-126F (and possibly current queue positions 124A-124F) of the next one, two, three, five, ten, etc. several users to be served by the merchant.

Turning back to the queues 120A-120N, each queue entry 122A is depicted as including a current queue position 124, a ticket alias 126, and a ticket value 128. As described herein, these values need not strictly be stored with the queue entry 122A, and in some embodiments not all of these values are utilized.

According to some embodiments, a current queue position 124 may include an identifier (e.g., an integer) signifying how close the particular queue entry 122 is to the front of the queue. In some embodiments, however, current queue positions 124A-124F are not literally recorded, but may instead be inferred or calculated. For example, the MQM module 130 may maintain a "head of queue" pointer (or signifier, such as a Boolean field) to track which queue entry 122 is at the front of the queue. In such embodiments, a current queue position 124 may be determined mathematically (e.g., by calculating a difference between a particular queue entry memory address and the "head of queue" queue entry memory address, by iterating through queue entries to determine a number of "hops" away a particular queue entry is from the "head of queue" queue entry, etc.).

In the depicted embodiment, the ticket aliases 126A-126F may include a "short" representation of a value associated with the queue entry 122A-122F, which may be used as a shorthand value to reference a particular queue entry 122.

Additionally, each illustrated queue entry 122A-122F further includes a ticket value 128, which may be a "long" representation of the value associated with the queue entry. In some embodiments, upon creation of a queue entry 122A, the MQM module 130 may generate a unique ticket value 128A, which, in some embodiments, is unique across all queues 120A-120N managed by the queuing system 100. For example, each ticket value 128 may comprise a 32-bit value, 64-bit value, 128-bit value, 256-bit value, etc. In this depiction, each ticket value 128 is represented as an alphanumeric string.

In some embodiments, ticket aliases 126 are similarly generated for the queue entries 122, and these ticket aliases 126 may or may not be based upon the corresponding ticket value 128A for that queue entry 122A. For example, the first queue entry 122A having a current queue position 124A of "1" has a ticket alias 126A of "ABCD", which is the first four alphanumeric characters of the corresponding ticket value 128A of "ABCDEFGH . . . ". Thus, in some embodiments a ticket alias (e.g., ticket alias 126A) may be algorithmically generated (e.g., select the first four characters of the associated ticket value 128A).

However, some or all of the ticket aliases 126A-126F may also be chosen/generated by the associated user 106. For example, the third queue entry 122C having a current queue position 124C includes a ticket alias 126C of "JONES,"

which is not based upon the ticket value 128C of "4DG5SDJH . . . ". Instead, this value may represent a first and/or last name of a user 106, a custom value (e.g., a nickname or phrase), etc.

Additionally, some or all of the ticket aliases 126A-126F may be generated by the associated merchant 116A. For example, the fifth depicted queue entry 122E having a current queue position 124E of "3" has a ticket alias 124E of "#39", which is not based upon the ticket value 128E and may instead be selected by the merchant 116A. For example, this ticket alias 126E may be the same as a value printed on a physical ticket pulled by (or printed for) a particular person/user 106 at the merchant location.

In some embodiments, the ticket values 128 may be kept "private" to the queuing system 100 and/or the associated user 106. Instead, the MQM module 130 may only report the ticket alias 126 to the merchant 116 for purposes of queue management/utilization, and similarly only the ticket alias 126 (i.e., not the ticket value 128 itself) may be displayed via the queue information 114 of display 112.

In some embodiments, the ticket values 128 may be used by the user 106 (e.g., via the user's client device 104 and/or application 105) to "check in" at (or for) the merchant or otherwise provide proof of "ownership" of a ticket.

As one example, upon creation of a queue entry 122A for a user 106, the MQM module 130 may provide a ticket alias 126A value to the merchant 116A and provide the ticket value 128A (and, in some embodiments, the ticket alias 126A) to the client device 104 of the user 106. When that user's queue entry has reached (or is about to reach) the front of the queue 120A for the merchant 116A, the user 106 may "check in" by having the client device 104, automatically or upon the user's 106 direction, provide an authentication data value to the MQM module 130 or merchant devices 108.

In some embodiments, the authentication data value comprises the ticket value 128A itself, which the client device 104 transmits to the MQM module 130. In response, the MQM module 130 may verify that the ticket value 128A is correct (i.e., matches a ticket value of the particular queue and possibly is associated with a queue entry at or near the front the queue), and may transmit an authentication result (e.g., match, no match, etc.) to the merchant devices 108 and/or client device 104 to indicate the result of the authentication. In some embodiments, this ticket value 128A may also have been initially provided to the merchant devices 108 (though not publicized via the queue information 114), and the user 106 (e.g., via client device 104) may instead present the ticket value 128A to the merchant devices 108, which can "locally" determine whether the presented ticket value 128A is valid.

In some embodiments, the MQM module 130 also maintains user profile data 132 for the users 106 seeking queue entries, which may include biographical information, location information, queue history information, password information, etc. In some embodiments, this user profile data 132 further includes user token values 134, which may comprise one or more encryption keys specific to the user 106.

For example, during an initial user registration process, the application 105 (e.g., a merchant-specific or queuing system-specific application, for example) may create a public/private key pair, and provide the public key to the MQM module 130, which it persists as user token value 134 data. (Alternatively, the MQM module 130 itself may generate the user token values 134.) Later, the client device 104 may utilize the private key to encrypt data used for "check in" or authentication purposes. As one example, to check in the client device 104 may encrypt the ticket value 128A of the user's queue entry (optionally with other information) and provide this encrypted data to the MQM module 130 (optionally via merchant devices 108). Thus, the MQM module 130 can decrypt the provided data using the user's stored public key for authentication purposes (e.g., decrypt a provided ticket value, determine whether the decrypted ticket value matches a valid ticket value of a queue, etc.). This configuration provides a benefit in that user authentication may occur without needing to disclose potentially sensitive information (e.g., biographical data, passwords, etc.) of the user 106 to the merchant 116A.

Of course, in other embodiments user token values 134 may be different types of asymmetric or symmetric keys or token values that are provided to the client device 104. Given the details of this disclosure, those of skill in the art would be able to create many related authentication schemes useful in various embodiments.

The client device 104 and some or all of merchant devices 108, as well as other computing devices used in this system (e.g., server(s) 108), may be of various different types of devices including, but not limited to, personal computers (PCs), desktops, mobile or handheld devices such as laptops, mobile phones, tablets, etc., and other types of devices. In some embodiments, the display 112 is a part of the merchant devices 108, such as in embodiments where merchant devices 108 comprise a tablet, smartphone, kiosk, wearable computer (e.g., Google Glass® head-mounted display) or "all-in-one" PC. In other embodiments (not depicted) the display 112 may be a separate device from the merchant devices 108 that the users (e.g., user 106 and/or employees of the merchant 116A) provide input to, and may comprise a television, monitor, or projector connected to a PC or other computer (e.g., a single-board computer such as a Raspberry Pi), laptop, media system, disc player (e.g., Blu-Ray or DVD), and the like.

Additionally, the client device 104 application 105 may be any of many different types of applications, such as a firmware software module of the client device 104, an operating system application (or portion thereof), a user-space application, etc. For example, the application 105 may be a native application configured to be executed by a particular operating system, a portable application such as a Java-based application, a web browser, an application executed by a web browser, a video game, a word processing or office productivity application, presentation software, etc.

Although the above description largely centered upon queue utilization for a single merchant 116A, some embodiments provide additional functionalities in multi-tenant multi-queue environments, and these functionalities will be discussed later herein with respect to FIGS. 3, 4, 5, etc.

Figure 2:
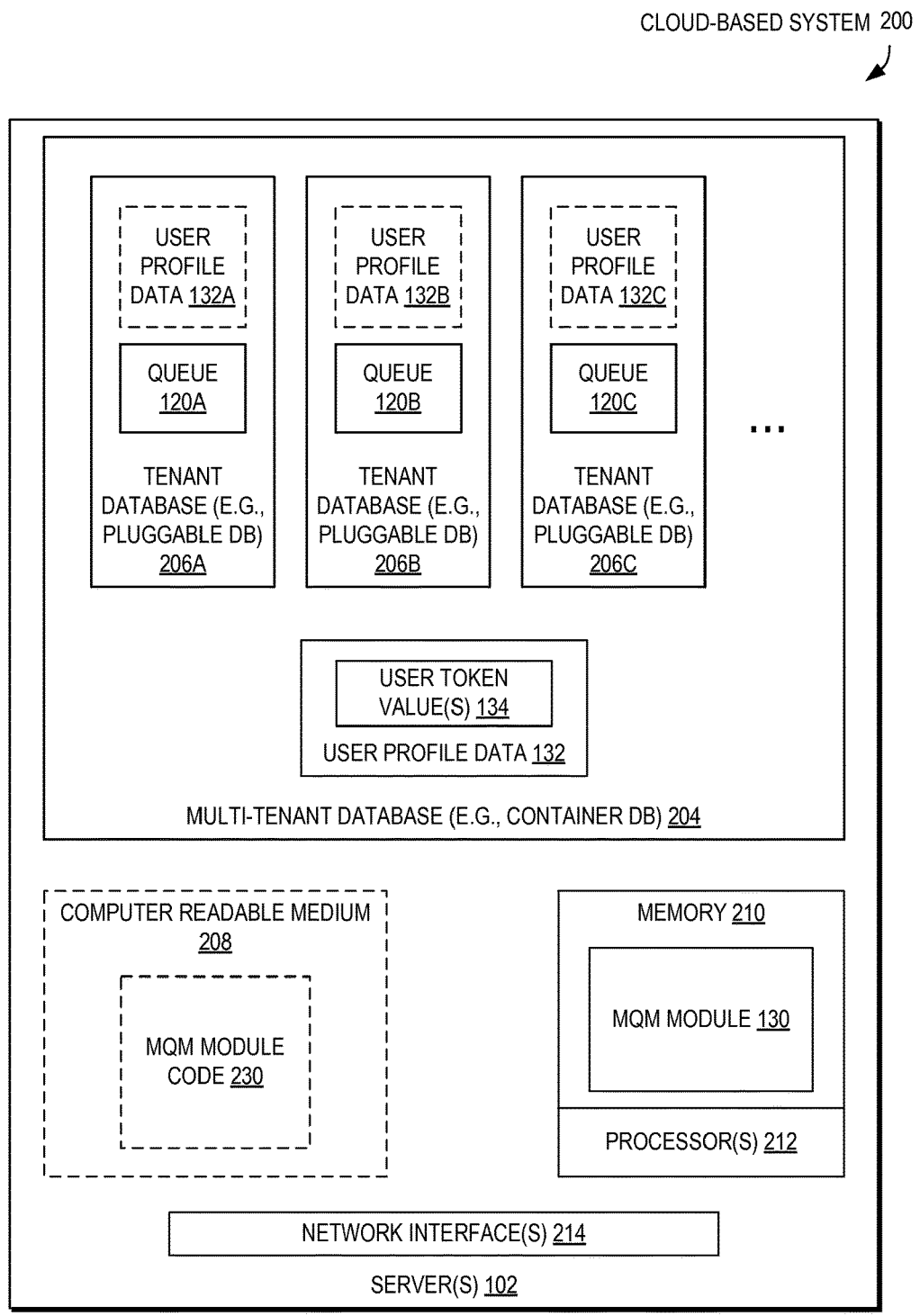
FIG. 2 illustrates a simplified block diagram of a multi-tenant cloud-based queuing system employing a multi-tenant queue management module according to some embodiments of the present invention.

Having now touched upon some aspects of the queuing system 100, we now turn to one illustrative hardware environment for providing multi-tenant queuing functionalities. FIG. 2 illustrates a simplified block diagram of a multi-tenant cloud-based queuing system 200 employing a multi-tenant queue management module 130 according to some embodiments of the present invention.

In this illustration, the cloud-based system 200 includes one or more servers 102 as illustrated in FIG. 1. The servers 102 may include one or more physical network interfaces 214 to communicatively couple the servers 102 with other computing devices (e.g., client device 104, merchant device(s) 108, etc.) across one or more communication networks 110. The one or more communication networks 110 can include networks of various types, each possibly including one or more networking devices or equipment including but not limited to network switches, routers, bridges, load balancers, etc. Examples of one or more communication networks 110 include, without restriction, the Internet, a wide area network (WAN), a local area network (LAN), an Ethernet network, a public or private network, a wired network, a wireless network, a virtual network, etc., and combinations thereof. Different communication protocols may be used to facilitate the communications through the one or more communication networks 110 including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

In some embodiments, each of the queues (e.g., queues 120A-120C) is maintained through a corresponding tenant database 206A-206C to provide isolation between the queues.

In some embodiments, each tenant database 206 comprises a pluggable database within a multi-tenant container database 204. However, in some embodiments, each tenant database 206 may simply be a subset of data from a single table or database. For example, in some embodiments a queue 120A from a first tenant database 206A may comprise a collection of tuples (i.e., rows) in a database table having a particular identifier value in a merchant identifier attribute (i.e., column). In yet other embodiments, the tenant databases 206 and/or multi-tenant database 204 may be implemented as other types of databases or data structures, including but not limited to flat files, linked-lists, etc.

In some embodiments, one or more of the tenant databases (e.g., tenant database 206A) also includes user profile data (e.g., user profile data 132A) associated with users having entries in the corresponding queue or users registered with the corresponding tenant/merchant. As described above, user profile data may include data such as biographical information, location information, queue history information, password information, and/or user token values 134 such as encryption keys. However, in some embodiments, user profile data 132 (with user token values 134) is stored separate from the individual tenant databases 206A-206C.

In the depicted embodiment, the MQM module 130 is implemented by MQM module code 230 (here illustrated as being stored in a computer-readable medium such as a magnetic disk, flash disk, optical disk, etc.) that has been loaded into a memory 210 and executed by one or more processors 212. Of course, at various times of execution, some or all of the multi-tenant database 204 and/or tenant databases 206A-206C may reside on a computer-readable medium 208 and/or within the memory 210. Additionally, in some embodiments the MQM module code 230 may be received by the server(s) 102 at network interfaces 214 and put into memory 210 for execution to yield the MQM module 130.

However, the cloud-based system 200 of the embodiment depicted in FIG. 2 is merely one example and is not intended to unduly limit the claimed embodiments of the present invention. Thus, one of ordinary skill in the art would recognize many possible variations, alternatives, and modifications to this illustrated system 200. Having discussed one potential hardware implementation for a multi-tenant cloud-based system 200, we now turn to several operations provided in multi-tenant multi-queue configurations.

Figure 3:
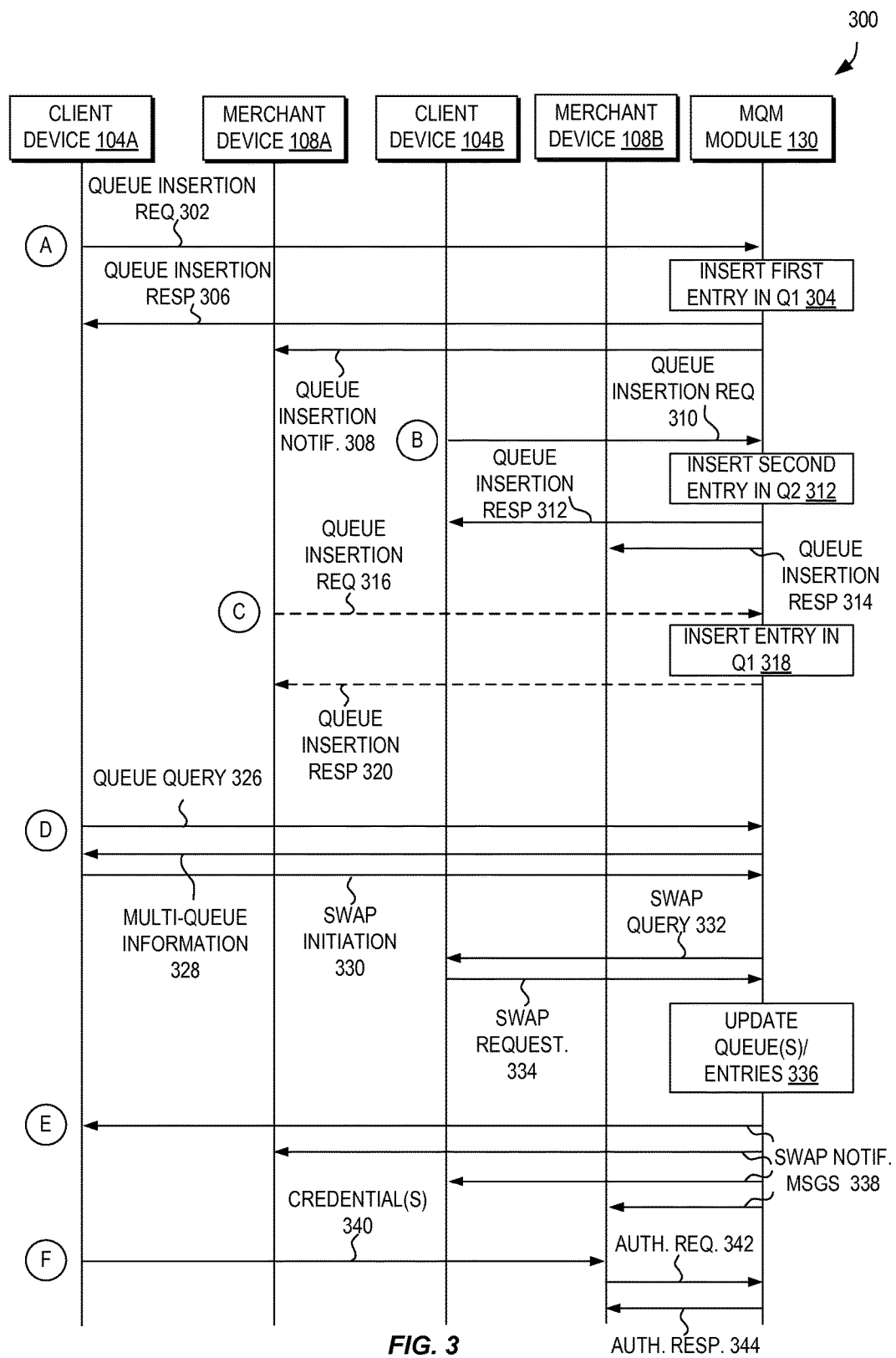
FIG. 3 illustrates a sequence diagram depicting multi-tenant multi-queue population and a multi-queue swap operation according to some embodiments of the present invention.

FIG. 3 illustrates a sequence diagram 300 depicting multi-tenant multi-queue population and a multi-queue swap operation according to some embodiments of the present invention. The depicted sequence diagram 300 includes messaging involving a first client device 104A of a user 106A, a first merchant device 108A of a first merchant 116A, a second client device 104B of a second user 106B, a second merchant device 108B of a second merchant 116B, and a MQM module 130.

At circle 'A', a first client device 104A transmits a queue insertion request message 302 to the MQM module 130. The queue insertion request message 302 identifies a queue of the first merchant, and may include a user identifier and/or a desired ticket alias 126. In response, at block 304 the MQM module 130 inserts a first queue entry into the desired queue for the first user. In an embodiment, block 304 includes generating a unique (e.g., across all queues) ticket value for the queue entry, and may include setting a ticket alias 126 to a desired ticket alias, if provided.

Next, the MQM module 130 may transmit a queue insertion response message 306 back to the first client device 104A, which may include a result associated with the queue insertion request message 302 (e.g., success, failure, etc.) and may include a generated ticket value 128, ticket alias 126, and/or current queue position 124. Similarly, the MQM module 130 may transmit a queue insertion notification message 308 to the merchant device 108A of the first merchant associated with the queue. This queue insertion notification message 308 may be the same as the queue insertion response message 306, and in some embodiments, it does not include an actual ticket value 128.

This process may also occur for other users and other merchants. For example, at circle 'B', a second client device 104B transmits a queue insertion request message 310 to the MQM module 130 seeking a queue entry in a second queue of a second merchant. In response, the MQM module 130 at block 312 similarly inserts a second entry in the second queue (including another unique generated ticket value, etc.), and transmits a similar queue insertion response message 312 back to the second client device 104B and a similar queue insertion notification message 314 to the second merchant device 108B of the second merchant (associated with the second queue). Of course, this queue insertion process may continue many times with additional client devices, users, merchants, and queues.

Additionally, in some embodiments, merchant devices may request queue entries to be inserted into their corresponding queues. For example, a merchant device may seek the creation of a queue entry when providing a physical ticket (or reservation) to a walk-in user (i.e., a user physically present at the merchant location) or a "call-ahead" user on the telephone attempting to make a reservation. Additionally, a merchant device may seek the creation of multiple queue entries at one point in time to assign to a number of physical tickets, for example.

Accordingly, at circle 'C', the first merchant device 108A transmits a queue insertion request message 316, which may potentially include a desired ticket alias such as a customer name, customer initials, or readable queue number, for example. Similarly, at block 318 the MQM module 130 inserts an entry into the first queue, and sends a queue insertion response message 320 back to the first merchant devices 108A.

At this point, the merchants may utilize their queues. For example, when a customer/user is serviced, the respective merchant device(s) may transmit queue update messages to the MQM module 130 to indicate that a queue entry is no longer necessary/valid, and in response, the MQM module 130 will update the associated queue information to remove or invalidate the queue entry, which may include renumbering current queue position 124 values and/or updating a "front of queue" pointer, and possibly transmit a queue update response message back to the merchant device to indicate a result of the update.

However, circle 'D' illustrates a multi-tenant feature of the queuing systems. At circle 'D', a client device 104A transmits a queue query request 326 to the MQM module 130, which performs a query responsive to the request, and transmits back multi-queue information 328 to the client device 104A. The queue query request 326 may include one or more criterion associated with queues or merchants specified by the user, such as a type or category of merchant, a location or range of locations of merchants, a current queue depth, a current estimated queue wait time, etc. As one example, a user may seek a list of restaurants having queues in the system that serve Mexican food, are located within 1 mile of a current location of the client device, are currently open, and currently have an estimated queue wait time of more than 60 minutes. Of course, many such criteria are possible, and thus this example is merely illustrative for ease of understanding.

Thus, the MQM module 130 may determine a result to the query by accessing information about the merchants and their associated queues, and then transmit back to the client device 104 with the multi-queue information 328 message a list of matching merchants. This list may be presented by the client device 104A to the user (e.g., with a user interface of a display).

In some embodiments, this returned multi-queue information 328 includes identifiers of queue entries in the matching merchant's queues that are listed as available for trade. For example, in some embodiments a user having a queue entry at a merchant may utilize their client device to interact with the MQM module 130 to indicate that they'd be willing to consider trading their spot in that queue. In some embodiments, this user may provide a textual description of what the user may desire in return for their queue entry, such as the types of queue entries at particular merchants (or categories of merchants) that the user seeks. In other embodiments, all queue entries in a particular queue are automatically, by the queuing system, designated as available for trade without any particular user action.

In this depicted example of FIG. 3, we assume that the second user, who has a queue entry within a second queue of the second merchant (see messages at circle 'B'), has indicated that their queue entry is available for trade.

Upon identifying this "available for trade" queue entry within the multi-queue information 328, the first user may cause their client device 104A to transmit a swap initiation message 330 that identifies the desired queue entry of the second user.

In an embodiment, the MQM module 130 then transmits a swap query message 332 identifying the first queue entry of the first user at the first merchant that is up for trade, and causes the second client device 104B to ask the second user if the trade is acceptable. In other embodiments, though, the second client device 104B (e.g., a second application) may be configured to automatically respond to such swap query messages based upon a set of user-defined conditions. To continue, we assume the details of the swap query 332 are presented to the second user, who accepts the swap proposal and thereby causes the second client device 104B to transmit a swap request message 334 indicating an acceptance of the swap and seeking for the swap to be implemented.

In response, the MQM module 130 then, at block 336, updates the respective query entries of the respective queues. In an embodiment, block 336 includes swapping the ticket values and/or ticket aliases between the first queue and the second queue.

At circle 'E', the MQM module 130 then transmits one or more swap notification messages 338 to the first client device 104A, the first merchant device 108A, the second client device 104B, and/or the second merchant device 108B.

The swap notification message 338 to the first client device 104A may indicate a result of the initial swap initiation (e.g., an acceptance or denial of the swap query) and indicate a current queue position of the first user in the second queue. Similarly, the swap notification message 338 to the second client device 104A may indicate a current queue position of the second user in the first queue.

Additionally, the swap notification message 338 to the first merchant device 108A may indicate a new ticket alias and/or ticket value (of the second user) that is now associated with the queue entry formerly held by the first user. Similarly, the swap notification message 338 to the second merchant device 108B may indicate a new ticket alias and/or ticket value (of the first user) that is now associated with the queue entry formerly held by the second user.

At circle 'F', the first user, having swapped his/her queue entry and thus now holds a queue entry at the second merchant, may "check in" at (or with) the second merchant devices 108B. In an embodiment, the first client device 104A provides credentials, which may include the first user's ticket value, ticket alias, personal information, encrypted data, etc. In response, the second merchant device 108B may self-authentication based upon data previously provided to it by the MQM module 130, or, as illustrated, transmit an authentication request (including some or all of the credential information) to the MQM module 130, which verifies the received credential information and transmits a result of the authentication back to the second merchant device 108B as authentication response message 344. During this verification, in some embodiments the MQM module 130 may be configured to automatically remove the associated queue entry of the first user from the second queue (e.g., such as when the verification succeeds) to indicate that the first user as having been serviced by the merchant.

In addition to multi-tenant queue entry swaps, some embodiments allow for additional or different multi-tenant/multi-queue operations. For example, FIG. 4 illustrates a sequence diagram depicting multi-queue utilization querying, automatic queue swaps, and backup queue insertions according to some embodiments of the present invention. Similar to FIG. 3, FIG. 4 also illustrates messaging and operations involving a first client device 104A of a first user 106A, a first merchant device 108A of a first merchant 116A, a second client device 104B of a second user 106B, a second merchant device 108B of a second merchant 116B, and a MQM module 130. The operations illustrated with respect to multiple circles A-C need not be performed by any one embodiment, although they could be. Instead, some, all, or none of these operations could be implemented by various embodiments.

Figure 4:
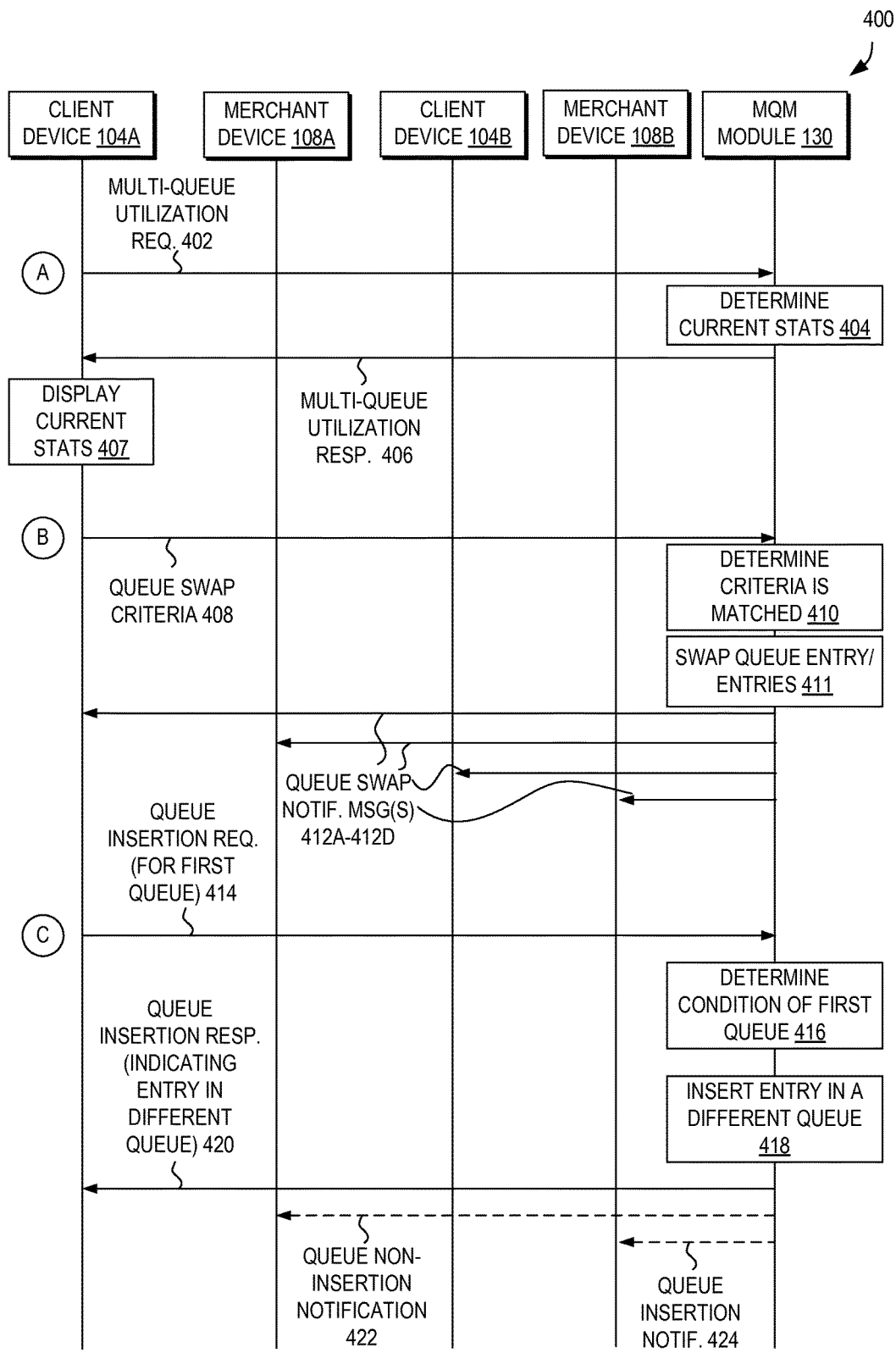
FIG. 4 illustrates a sequence diagram depicting multi-queue utilization querying, automatic queue swaps, and backup queue insertions according to some embodiments of the present invention.

For example, circle 'A' of FIG. 4 illustrates an embodiment providing multi-queue utilization querying. At circle 'A', a client device 104A transmits a multi-queue utilization request message 402 to the MQM module 130 to seek queue utilization information for a plurality of queues maintained in the multi-tenant system. In some embodiments, the client device 104A indicates which of the queues this information is sought; for example, a user of the client device 104A may select a list of queues of interest from a graphical user interface, causing the client device 104A to transmit a set of queue identifiers (or merchant/tenant identifiers, etc.) to the MQM module 130. In some embodiments, the user instead provides/enters/selects a set of criteria, causing the client device 104A to transmit the criteria to the MQM module 130 as part of the multi-queue utilization request message 402. As described above, the set of criteria may be based upon one or more of queue configuration data (e.g., a total number of queue entries allowed in a queue), current queue operational characteristics (e.g., a total number of queue entries currently in the queue, an expected wait time for any new queue entry placed in the queue), tenant/merchant characteristics (e.g., a name of a merchant, category/type of merchant, location of merchant, etc.), queue entry user characteristics (e.g., whether any queue entries are configured as available for trade, whether any particular users have queue entries in a queue, etc.). In some embodiments, a multi-queue utilization request message 402 may be a type of queue query message 326 described with respect to FIG. 3.

At block 404, the MQM module 130 analyzes the multi-queue utilization request message 402, identifies a set of queues matching the criteria of the multi-queue utilization request message 402, and may determine a set of statistics for these queues. For example, in some embodiments the determined statistics may include one or more of a number of queue entries currently in a matched queue, a number of queue entry slots available in a queue, an expected queue wait time for a queue, etc.

The MQM module 130, then, transmits a multi-queue utilization response message 406, which includes the determined queue statistics, back to the client device 104A, which at block 407 may display some or all of the current queue statistics to a user. Accordingly, through one pair of multi-queue utilization request/response messages, a user may be provided immediate insight into potentially many different queue characteristics of potentially many different tenants/merchants at one time.

Another multi-tenant feature provided by some embodiments of the queuing system is presented at circle 'B' of FIG. 4, which illustrates an embodiment providing automatic queue swaps. At circle 'B', the client device 104A transmits a queue swap criteria message 408 to the MQM module 130. The queue swap criteria message 408 includes one or more criteria indicating a condition that, if it exists, indicates a desire of the sending user to swap the user's queue entry (e.g., in a first queue of a first merchant) for another queue entry (e.g., in the same first queue, in a second queue of the first merchant, or in another queue of a different merchant). For example, the one or more criteria may include an allowable date, range of dates, time, range of times, allowable type of merchant/queue, allowable position within a queue of a matching queue entry, allowable estimated wait time within a queue of a matching queue entry, allowable queue/merchant identifiers, etc. These criteria may be represented as a set of logical statements (e.g., utilizing comparison operators), and may, in some embodiments, be represented using a set of code statements (e.g., JavaScript code). As one simple example for the sake of illustration, a queue swap criteria message 408 may include criteria for the user's first queue entry in a first merchant queue representing the following logic: during the next 15 minutes, the system may automatically swap my first queue entry for the highest-positioned queue entry within a queue operated by merchant 6, 34, or 762 that is marked as available for trade, is within the top 5% of the queue entries of that queue, and has an expected wait time (within that queue) that is less than the corresponding expected wait time of the first queue entry at that same point in time.

In some embodiments, the queue swap criteria message 408 may further include one or more identifiers of one or more trade subjects. For example, the queue swap criteria message 408 may indicate that the first user is willing to trade both a first queue entry of a first queue as well as a second queue entry of a second queue (of a same or different merchant/tenant) for one queue entry satisfying some stipulated set of criteria. As another example, the queue swap criteria message 408 may identify another asset that will be swapped for a desired queue entry. Thus, the queue swap criteria message 408 may seek to trade a first queue entry for a second queue entry, a first queue entry along with another asset (e.g., another queue entry, a financial amount, a physical asset, etc.) for a second queue entry, or perhaps just another asset (e.g., a physical asset or financial amount) for a queue entry.

At block 410, the MQM module 130 may determine that the criteria of the queue swap criteria message 408 is satisfied or matched by a second queue entry (associated with a second merchant utilizing the second merchant device 108B) of a second user (associated with the second client device 104B), and may, at block 411, automatically cause the queue entry or queue entries to be swapped. In an embodiment where only one queue entry is being re-assigned (or swapped), the MQM module 130 may, for example, provide the ticket value of the queue entry to the first client device 104A and/or cause the ticket value to be removed from the second client device 104B. In some embodiments, the MQM module 130 may instead replace a ticket value (and/or ticket alias) of the queue entry with new values, which are then provided to the first client device 104A and/or second merchant device 108B (i.e., associated with the second queue where the entry is) as queue swap notification messages 412A and 412D, for example. In embodiments where a queue entry is swapped for another queue entry, the MQM module 130 may swap the ticket values (and/or ticket aliases), and provide the relevant updates, via queue swap notification messages 412A-412D, to the involved devices.

Another multi-tenant feature provided by some embodiments of the queuing system is presented at circle 'C' of FIG. 4, which an embodiment providing backup queue insertions. In some embodiments, the MQM module 130 may be configured to automatically reserve a spot (i.e., create a queue entry) in a different queue—possibly at a different merchant/tenant—than what is requested. This automatic reservation may occur, for example, when a requested queue is full or when an anticipated queue wait time meets or exceeds a configured value.

For example, at circle 'C' the first client device 104A (of a first user) transmits a queue insertion request message 414 seeking a spot to be reserved (i.e., a queue entry to be created) within a first queue of a first merchant. However, at block 416, the MQM module 130 determines that a condition of the first queue exists. For example, a condition may be configured to exist when the queue does not have any available queue entries. As another example, a condition may be configured to exist when a particular number of queue entries currently exist in the queue, a particular percentage of queue entries current exist in a queue from a number of allowed queue entries, a particular expected queue wait time for new queue entries meets or exceeds a threshold value, the merchant/tenant is known to be closing soon, a merchant/tenant is known to only be open for an amount of time that is less than a current expected queue wait time for new queue entries, etc.

In response, at block 418 the MQM module 130 inserts an entry for the first user into a different queue (i.e., a queue that is not the requested/identified queue from the queue insertion request message 414). This block may include, identifying, by the MQM module 130, one or more other candidate backup queues, which may be based upon a similar category of merchant, location of merchant, type of merchant, etc. This block may further include, selecting, by the MQM module 130, one of the candidate backup queues, and inserting an entry for the first user in this selected queue. The selecting of the one queue may occur based upon selecting a queue with a minimum estimated queue wait time for new queue entries of those queues, or selecting a queue with a minimum current number of queue entries, for example. In other embodiments, though, multiple backup queues may be selected, and thus, multiple "backup" queue entries may be created for the first user. Additionally, in some embodiments a "backup" queue reservation may be made (at a different queue) in addition to inserting a queue entry in the requested queue. Of course, many other configurations exist in various embodiments using different merchant and/or queue information in the system for determining queue conditions, identifying candidate backup queues, and selecting one of the backup queues. Thus, these examples are illustrative and not to be viewed as exhaustive or limiting.

Then, after block 418, the MQM module 130 transmits a queue insertion response message 420 to the first client device 104A, which identifies the "different" queue that the MQM module 130 inserted a queue entry into for the user, and may indicate that a queue entry in the requested first queue was not granted. In some embodiments, this queue insertion response message 420 includes a ticket value and/or a ticket alias for the queue entry in the "different" (i.e., non-requested) queue.

Optionally, in some embodiments, the MQM module 130 may transmit a queue non-insertion notification message 422 to the first merchant device 108A of the first merchant, which indicates that a client device 104A attempted to secure a queue location but was not able to do so. This may allow a merchant to change a configuration of the queue(s) of the merchant (e.g., expand a number of allowable queue entries, etc.).

In some embodiments, the MQM module 130 may transmit a queue insertion notification message 424 to the merchant device 108B of the second merchant, which for purposes of explanation we assume is associated with the "another" queue selected as the backup queue and now including a queue entry for the first user. This queue insertion notification message 424 may include a ticket alias of the inserted queue entry and/or some user information (e.g., biographical information such as a name or phone number, for example) of the user associated with the inserted queue entry.

An exemplary flow is now presented in accord with some embodiments of the invention. The operations of this flow is described with reference to the exemplary embodiments of the other diagrams. However, it should be understood that the operations of this flow diagram can be performed by embodiments of the invention other than those discussed with reference to these other diagrams, and the embodiments of the invention discussed with reference these other diagrams can perform operations different than those discussed with reference to the flow diagram. Also, though the flow diagram in this figure shows a particular order of operations performed by certain embodiments of the invention, it should be understood that such order is exemplary (e.g., alternative embodiments may perform the operations in a different order, combine certain operations, overlap certain operations, etc.).

Figure 5:
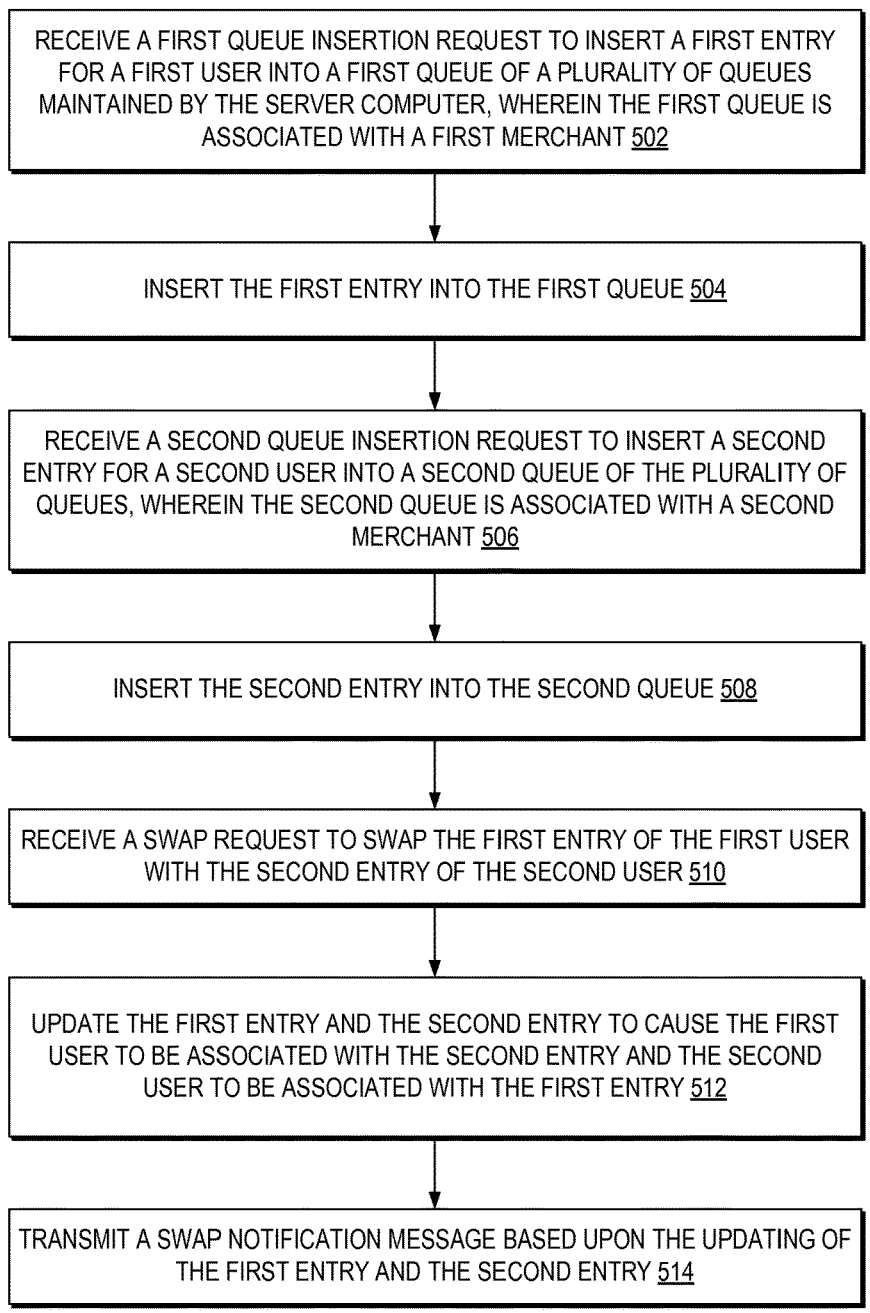
FIG. 5 illustrates a flow in one or more server computing devices of a multi-tenant cloud-based queuing system for performing an inter-tenant queue swap according to some embodiments of the present invention.

FIG. 5 illustrates a flow 500 in one or more server computing devices of a multi-tenant cloud-based queuing system for performing an inter-tenant queue swap according to some embodiments of the present invention. In some embodiments, the flow of FIG. 5 may be performed by the MQM module of FIG. 1, FIG. 2, FIG. 3, or FIG. 4.

The flow 500 includes, at block 502, receiving a first queue insertion request to insert a first entry for a first user into a first queue of a plurality of queues maintained by the server computer. This first queue is associated with a first merchant, and may be maintained as a tenant database within a cloud-based multi-tenant database.

At block 504, the flow 500 includes causing the first entry to be inserted into the first queue. This may include generating a ticket value, which may be unique across all queues of all tenants. This block may also include generating a ticket alias, and/or determining a current queue position value for the first entry. In some embodiments, the ticket value and/or ticket alias is transmitted to a client device of the first user, and in some embodiments the ticket value and/or ticket alias is transmitted to a merchant device of the first merchant.

Similarly, the flow 500 also includes block 506, in which a second queue insertion request is received, which is a request to insert a second entry for a second user into a second queue of the plurality of queues. The second queue is associated with a second merchant. At block 506, the flow 500 includes causing the second entry to be inserted into the second queue. The second entry may include a generated ticket value and/or ticket alias. In some embodiments, the ticket value and/or ticket alias of the second entry is transmitted to a client device of the second user, and in some embodiments the ticket value and/or ticket alias of the second entry is transmitted to a merchant device of the second merchant.

At this point, in some embodiments the flow 500 includes receiving a swap initiation message (see swap initiation message 330 of FIG. 3) that may identify the second queue entry and/or second user, and may have been transmitted by the client device of the first user. The flow 500 may also include sending a swap query message (see swap query message 332 of FIG. 3) to the second user's client device.

At block 510, the flow 500 includes receiving a swap request to swap the first entry of the first user with the second entry of the second user. The swap request may be transmitted by a client device of the second user.

In response, the flow 500 may include block 512, in which the first entry and the second entry are updated to cause the first user to be associated with the second entry and the second user to be associated with the first entry. In an embodiment, block 512 includes switching a ticket value and/or ticket alias of each of the first entry with the corresponding value(s) of the second entry.

In an embodiment, flow 500 also includes block 514, in which a swap notification message is transmitted based upon the updating of the first entry and the second entry. In an embodiment, a swap notification message is transmitted to the first user's client device indicating a completion of the swap, to the second user's client device indicating a completion of the swap, and/or possibly to one or both associated merchant devices associated with the affected first and second queues.

Figure 6:
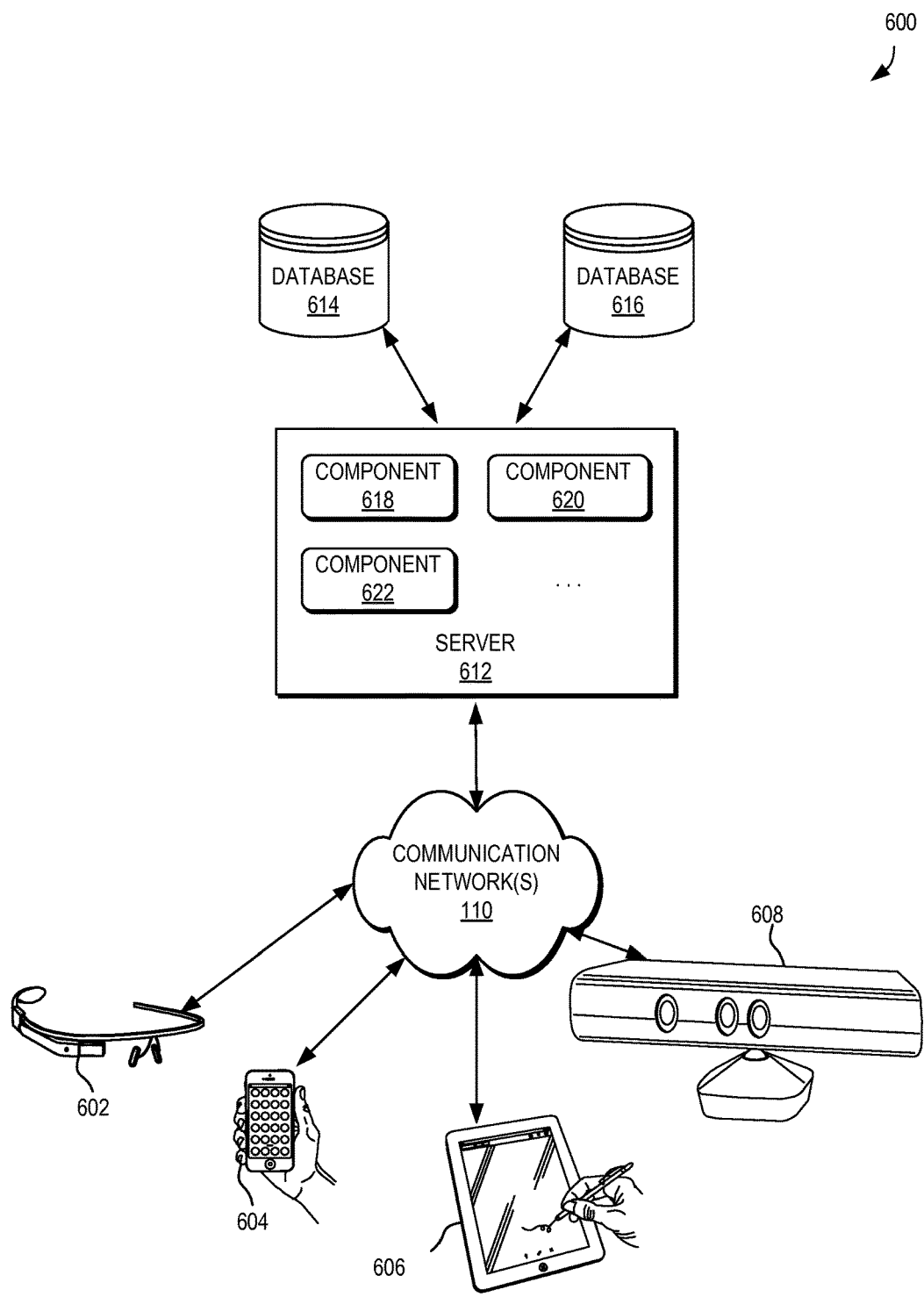
FIG. 6 illustrates a simplified diagram of a distributed system for implementing some embodiments of the present invention.

FIG. 6 illustrates a simplified diagram of a distributed system for implementing some embodiments of the present invention. In the illustrated embodiment, distributed system 600 includes one or more client computing devices 602, 604, 606, and 608 (e.g., examples of client device 104), which are configured to execute and operate a client application (e.g., application 105) such as a web browser, proprietary client (e.g., Oracle Forms), or the like over one or more network(s) 110. Server 612 may be communicatively coupled with remote client computing devices 602, 604, 606, and 608 via network 110.

In various embodiments, server 612 may be adapted to run one or more services or software applications such as services and applications that provide code and/or data for maintaining queues in a multi-tenant cloud environment. In certain embodiments, server 612 may also provide other services or software applications that can include non-virtual and virtual environments. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, software components 618, 620 and 622 of system 600 are shown as being implemented on server 612. As one example, one or more of the components (e.g., software component 1018) may be the MQM module 130 discussed throughout the application.

In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

Client computing devices 602, 604, 606, and/or 608 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 110.

Although distributed system 600 in FIG. 6 is shown with four client computing devices, any number of client computing devices may be supported. Other devices, such as devices with sensors, etc., may interact with server 612.

Communication network(s) 110 in distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red (IR) network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization. One or more flexible pools of logical storage devices can be virtualized to maintain virtual storage devices for the server. Virtual networks can be controlled by server 612 using software defined networking. In various embodiments, server 612 may be adapted to run one or more services or software applications described in the foregoing disclosure. For example, server 612 may correspond to a server (e.g., servers 102) for performing processing as described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. These databases may provide a mechanism for storing information such as user interactions information, usage patterns information, adaptation rules information, and other information used by embodiments of the present invention. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands. However, databases 614 and 616 may provide relational databases, object-oriented databases, object-relational databases, NoSQL databases, etc., and may or may not be SQL-based. For example, databases 614 and/or 616 may be Oracle Database, PostgreSQL, Microsoft SQL Server, MySQL, MemSQL, Memcached, Redis, MongoDB, BigTable, Cassandra, DB2, Solr, etc.

Figure 7:
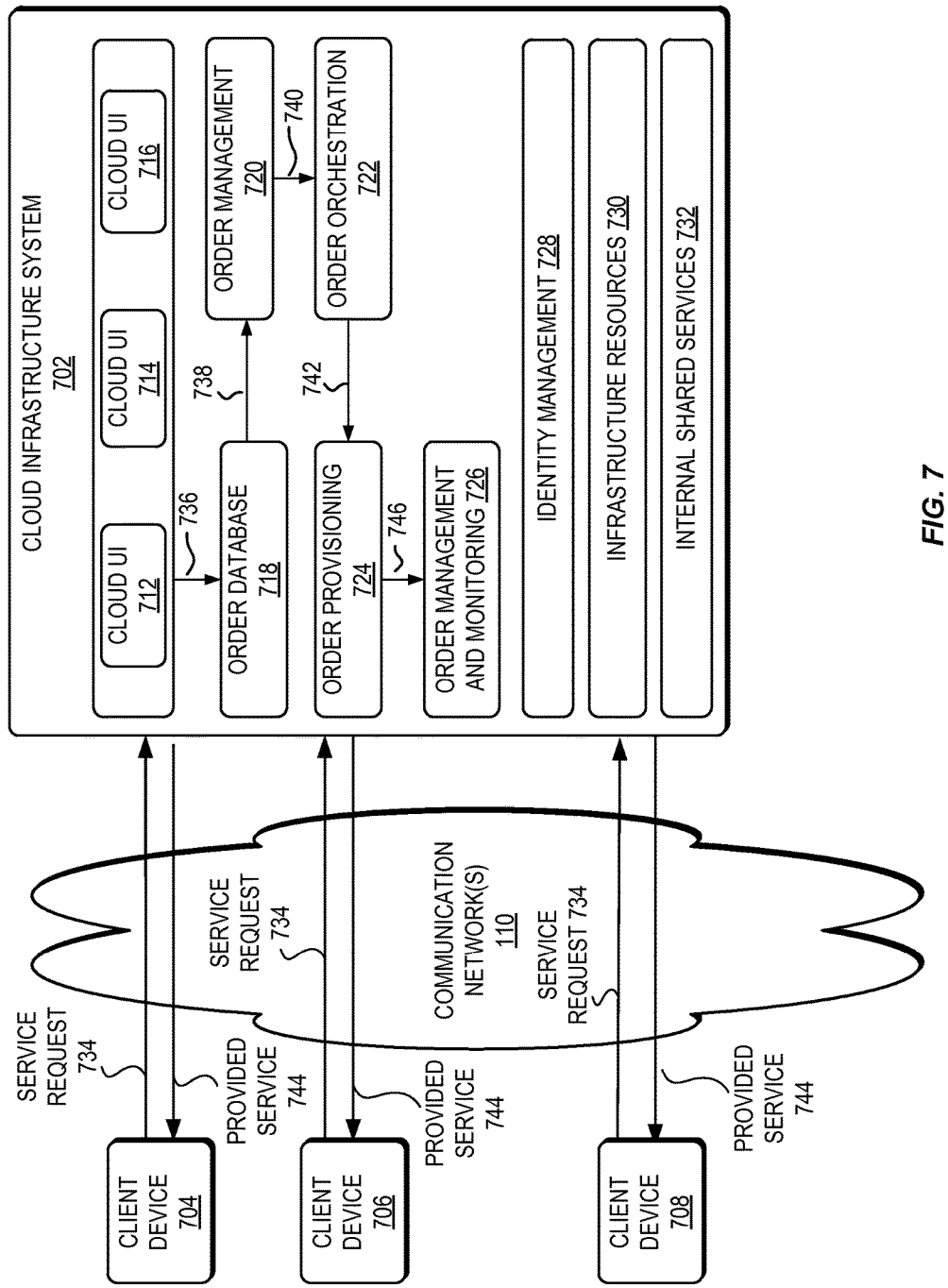
FIG. 7 is a simplified block diagram of one or more components of a system environment in which services may be offered as cloud services, in accordance with some embodiments of the present invention.

In some embodiments, code and/or data for managing and utilizing queues for multiple tenants/merchants may be offered as services via a cloud environment. FIG. 7 is a simplified block diagram of one or more components of a system environment 700 in which services may be offered as cloud services, in accordance with some embodiments of the present disclosure. In the illustrated embodiment in FIG. 7, system environment 700 includes one or more client computing devices 704, 706, and 708 that may be used by users to interact with a cloud infrastructure system 702 that provides cloud services. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Communication network(s) 110 may facilitate communications and exchange of data between clients 704, 706, and 708 and cloud infrastructure system 702. Each network may be any type of network familiar to those skilled in the art that can support data communications using any of a variety of commercially-available protocols, including those described above for communication network(s) 110.

In certain embodiments, services provided by cloud infrastructure system 702 may include a host of services that are made available to users of the cloud infrastructure system on demand. In addition to services related to providing code and/or data for an application utilizing an event-based architecture for expand-collapse operations, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 722 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
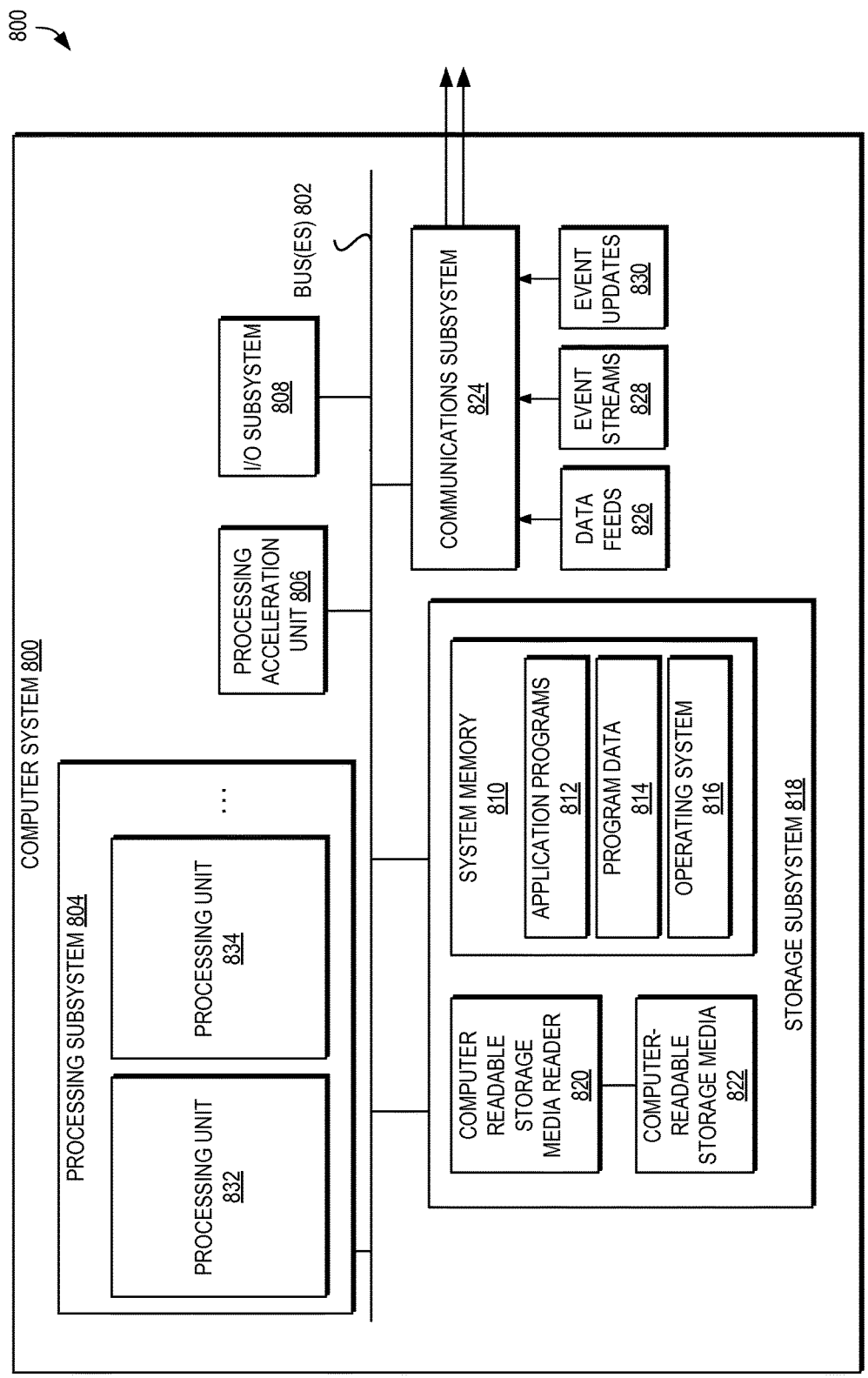
FIG. 8 illustrates an exemplary computer system that may be used to implement certain components according to some embodiments of the present invention.

FIG. 8 illustrates an exemplary computer system 800 that may be used to implement certain components according to some embodiments of the present invention. In some embodiments, computer system 800 may be used to implement any of the various servers and computer systems described above. As shown in FIG. 8, computer system 800 includes various subsystems including a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors (GPUs), digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above for an application utilizing an event-based architecture for expand-collapse operations.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
receiving, at a server computer of a queue management system, from a first device of a first merchant via a communication network, a first queue insertion request to insert a first entry for a first user into a first queue of a plurality of queues maintained by the server computer, wherein the first queue is associated with the first merchant, wherein the first entry corresponds to a first service provided by the first merchant to the first user;
inserting, by the server computer, the first entry into the first queue;
receiving, at the server computer, via the communication network, from a second device of a second merchant different from the first merchant, a second queue insertion request to insert a second entry for a second user into a second queue of the plurality of queues, wherein the second queue is associated with the second merchant, wherein the second entry corresponds to a second service provided by the second merchant to the second user, and wherein the second queue is different from the first queue;
inserting, by the server computer, the second entry into the second queue;
receiving, at the server computer, via the communication network, from a first client device associated with the first user, a swap request by the first user to swap the first entry in the first queue with the second entry in the second queue, wherein the swap request includes a set of queue swap criteria specified by the first user, wherein the set of queue swap criteria includes a merchant characteristic;
determining, by the server computer, that the set of queue swap criteria specified by the first user is satisfied by the second entry;
upon determining that the set of queue swap criteria is satisfied by the second entry, sending, by the server computer, via the communication network, to a second client device associated with the second user, a request for the second user to accept the request to swap the first entry in the first queue with the second entry in the second queue, wherein the server computer facilitates communication between the first client device and the second client device that utilize a different communication protocol;
responsive to the request, receiving, at the server computer, via the communication network, from the second client device, a response by the second user indicating an acceptance of the request to swap the first entry in the first queue with the second entry in the second queue;
based on receiving the response indicating the acceptance from the second client device, updating, by the server computer, the first entry and the second entry to cause the first user to be associated with the second entry and the second user to be associated with the first entry; and
transmitting, by the server computer, via the communication network, to each of the first client device and the second client device, a swap notification message based upon the updating of the first entry and the second entry, the swap notification message indicating that the first entry in the first queue is swapped with the second entry in the second queue;
generating, by the server computer, a ticket value, wherein the ticket value is associated with the first entry of the first queue;
receiving, at the server computer from the second device of the second merchant, an authentication request including the ticket value and further including a first value that is generated based upon a first token of the first user;
determining, by the server computer, an authentication result based upon transforming the first value using a second token of the first user; and
transmitting, by the server computer to a second device of the second merchant, an authentication response including the authentication result.

2. The method of claim 1, wherein the first queue insertion request is received at the server computer from a mobile device of the first user.

3. The method of claim 2, further comprising:
receiving, at the server computer from a single merchant device of the first merchant, a plurality of queue insertion requests to insert a corresponding plurality of entries for a plurality of users into the first queue.

4. The method of claim 1, wherein the first entry is inserted into the first queue at a first position, and wherein the method further comprises:
updating, by the server computer, the first queue to cause the first entry to be associated with a second position; and
responsive to a determination that the first user is unable to be served by the first merchant at a first time, updating, by the server computer, the first queue to cause the first entry to be associated with a third position.

5. The method of claim 1, further comprising:
generating, by the server computer, a ticket value, wherein the ticket value is associated with the first entry of the first queue;
transmitting, by the server computer, the ticket value to a mobile device of the first user; and
transmitting, by the server computer, a ticket alias of a ticket queue value to a first merchant device of the first merchant or to the second device of the second merchant.

6. The method of claim 1, further comprising:
receiving, at the server computer, a queue request seeking a data describing a utilization of at least two of the plurality of queues; and
responsive to said receiving the queue request, transmitting a queue response message including the data, wherein the data describes a current utilization of the first queue and further describes a current utilization of the second queue.

7. The method of claim 1, further comprising:
receiving, at a server computer, a third queue insertion request to insert a third entry for a third user into the first queue; and
responsive to determining that a current utilization of the first queue meets or exceeds a threshold value, automatically inserting the third entry for the third user into a third queue of the plurality of queues, wherein the third queue is associated with a third merchant.

8. The method of claim 1, wherein the first queue of the plurality of queues is a first data structure including a first plurality of queue entries arranged in a first order,
wherein each queue entry in the first plurality of queue entries in the first data structure is indexed by a queue position associated with the queue entry based on the first order of the first plurality of queue entries,
wherein the first plurality of queue entries includes the first entry,
wherein the second queue of the plurality of queues is a second data structure including a second plurality of queue entries arranged in a second order,
and wherein the second plurality of queue entries includes the second entry.

9. The method of claim 1, wherein the set of queue swap criteria is represented as a set of logical statements.

10. The method of claim 1, wherein the set of queue swap criteria is represented as a set of code statements.

11. The method of claim 1, wherein the merchant characteristic in the set of queue swap criteria is a name of the second merchant.

12. The method of claim 1, wherein the merchant characteristic in the set of queue swap criteria is a type of the second merchant.

13. The method of claim 1, wherein the merchant characteristic in the set of queue swap criteria is a location of the second merchant.

14. A non-transitory computer readable storage medium having instructions which, when executed by one or more processors of a server computer, cause the one or more processors to perform operations comprising:
receiving, at a server computer of a queue management system, from a first device of a first merchant via communication network, a first queue insertion request to insert a first entry for a first user into a first queue of a plurality of queues maintained by the server computer, wherein the first queue is associated with the first merchant, wherein the first entry corresponds to a first service provided by the first merchant to the first user;
inserting, by the server computer, the first entry into the first queue;
receiving, at the server computer, via the communication network, from a second device of a second merchant different from the first merchant, a second queue insertion request to insert a second entry for a second user into a second queue of the plurality of queues, wherein the second queue is associated with the second merchant, wherein the second entry corresponds to a second service provided by the second merchant to the second user, and wherein the second queue is different from the first queue;
inserting, by the server computer, the second entry into the second queue;
receiving, at the server computer, via the communication network, from a first client device associated with the first user, a swap request by the first user to swap the first entry in the first queue with the second entry in the second queue, wherein the swap request includes a set of queue swap criteria specified by the first user, wherein the set of queue swap criteria includes a merchant characteristic;
determining, by the server computer, that the set of queue swap criteria specified by the first user is satisfied by the second entry;
upon determining that the set of queue swap criteria is satisfied by the second entry, sending, by the server computer, via the communication network, to a second client device associated with the second user, a request for the second user to accept the request to swap the first entry in the first queue with the second entry in the second queue, wherein the server computer facilitates communication between the first client device and the second client device that utilize a different communication protocol;
responsive to the request, receiving, at the server computer, via the communication network, from the second client device, a response by the second user indicating an acceptance of the request to swap the first entry in the first queue with the second entry in the second queue;
based on receiving the response indicating the acceptance from the second client device, updating, by the server computer, the first entry and the second entry to cause the first user to be associated with the second entry and the second user to be associated with the first entry; and
transmitting, by the server computer, via the communication network, to each of the first client device and the second client device, a swap notification message based upon the updating of the first entry and the second entry, the swap notification message indicating that the first entry in the first queue is swapped with the second entry in the second queue;
generating, by the server computer, a ticket value, wherein the ticket value is associated with the first entry of the first queue;
receiving, at the server computer from the second device of the second merchant, an authentication request including the ticket value and further including a first value that is generated based upon a first token of the first user;
determining, by the server computer, an authentication result based upon transforming the first value using a second token of the first user; and
transmitting, by the server computer to a second device of the second merchant, an authentication response including the authentication result.

15. The non-transitory computer readable storage medium of claim 14, wherein the first queue insertion request is received at the server computer from a mobile device of the first user, and wherein the operations further comprise:
receiving, from a single merchant device of the first merchant, a plurality of queue insertion requests to insert a corresponding plurality of entries for a plurality of users into the first queue.

16. A server computing device, comprising:
one or more processors; and
a non-transitory computer readable storage medium having instructions which, when executed by the one or more processors, cause the one or more processors to perform operations comprising:
receiving, at the server computing device, from a first device of a first merchant via a communication network, a first queue insertion request to insert a first entry for a first user into a first queue of a plurality of queues maintained by the server computer, wherein the first queue is associated with the first merchant, wherein the first entry corresponds to a first service provided by the first merchant to the first user;
inserting, by the server computing device, the first entry into the first queue;

receiving, at the server computing device, via the communication network, from a second device of a second merchant different from the first merchant, a second queue insertion request to insert a second entry for a second user into a second queue of the plurality of queues, wherein the second queue is associated with the second merchant, wherein the second entry corresponds to a second service provided by the second merchant to the second user, and wherein the second queue is different from the first queue;

inserting, by the server computing device, the second entry into the second queue;

receiving, by the server computing device, via the communication network from a first client device associated with the first user, a swap request by the first user to swap the first entry in the first queue with the second entry in the second queue, wherein the swap request includes a set of queue swap criteria specified by the first user, wherein the set of queue swap criteria includes a merchant characteristic;

determining, by the server computer, that the set of queue swap criteria specified by the first user is satisfied by the second entry;

upon determining that the set of queue swap criteria is satisfied by the second entry, sending, by the server computing device, via the communication network to a second client device associated with the second user, a request for the second user to accept the request to swap the first entry in the first queue with the second entry in the second queue, wherein the server facilitates communication between the first client device and the second client device that utilize a different communication protocol;

responsive to the request, receiving, at the server computing device, via the communication network from the second client device, a response by the second user indicating an acceptance of the request to swap the first entry in the first queue with the second entry in the second queue;

based on receiving the response indicating the acceptance from the second client device, updating, by the server computing device, the first entry and the second entry to cause the first user to be associated with the second entry and the second user to be associated with the first entry; and transmitting, by the server computing device, via the communication network, to each of the first client device and the second client device, a swap notification message based upon the updating of the first entry and the second entry, the swap notification message indicating that the first entry in the first queue is swapped with the second entry in the second queue;

generating, by the server computing device, a ticket value, wherein the ticket value is associated with the first entry of the first queue;

receiving, at the server computing device from the second device of the second merchant, an authentication request including the ticket value and further including a first value that is generated based upon a first token of the first user;

determining, by the server computing device, an authentication result based upon transforming the first value using a second token of the first user; and transmitting, by the server computing device to a second device of the second merchant, an authentication response including the authentication result.

17. The server computing device of claim 16, wherein the first queue insertion request is received at the server computing device from a mobile device of the first user, and wherein the operations further comprise:

receiving, from a single merchant device of the first merchant, a plurality of queue insertion requests to insert a corresponding plurality of entries for a plurality of users into the first queue.

18. The server computing device of claim 16, wherein the first entry is inserted into the first queue at a first position, and wherein the operations further comprise:

updating the first queue to cause the first entry to be associated with a second position; and responsive to a determination that the first user is unable to be served by the first merchant at a first time, updating the first queue to cause the first entry to be associated with a third position.

* * * * *

UNITED STATES PATENT AND TRADEMARK OFFICE
CERTIFICATE OF CORRECTION

PATENT NO. : 10,063,661 B2
APPLICATION NO. : 14/597074
DATED : August 28, 2018
INVENTOR(S) : Jan et al.

Page 1 of 1

It is certified that error appears in the above-identified patent and that said Letters Patent is hereby corrected as shown below:

In the Specification

In Column 2, Line 48, delete "then" and insert -- than --, therefor.

Signed and Sealed this
Ninth Day of July, 2019

Andrei Iancu
*Director of the United States Patent and Trademark Office*